United States Patent

Delus et al.

[11] Patent Number: 5,951,089
[45] Date of Patent: Sep. 14, 1999

[54] SUN VISOR FOR MOTOR VEHICLES

[75] Inventors: Christian Delus, Saro, Sweden; Marc Agro, Saint Avold, France

[73] Assignee: Becker Group Europe GmbH, Wuppertal, Germany

[21] Appl. No.: 09/189,885

[22] Filed: Nov. 11, 1998

[30] Foreign Application Priority Data

Nov. 11, 1997 [DE] Germany .............................. 19749795

[51] Int. Cl.⁶ ....................................................... B60J 3/02
[52] U.S. Cl. ........................................................ 296/97.11
[58] Field of Search ......................................... 296/97.11

[56] References Cited

U.S. PATENT DOCUMENTS

| | | | |
|---|---|---|---|
| 3,865,428 | 2/1975 | Chester | 296/97.11 |
| 5,040,840 | 8/1991 | Kokeisl | 296/97.11 |
| 5,484,183 | 1/1996 | Rosa | 296/97.11 |
| 5,678,880 | 10/1997 | Keller | 296/97.11 |

Primary Examiner—Gary C. Hoge
Attorney, Agent, or Firm—Harness, Dickey & Pierce, P.L.C.

[57] ABSTRACT

A sun visor for motor vehicles, in particular for commercial vehicles, is described, which is mainly intended for placement in the area of the long side of the cab and has a sun visor body (1), which has two seating brackets (2), can be pivoted around an approximately horizontal pivot axis and is displaceably conducted via the seating brackets (2) along a guide rail (4) which is parallel with the pivot axis and has a C-shaped profile, open toward the visible side. In accordance with the invention it is provided, that the ends of the seating brackets (2) facing away from the sun visor body (1) are arranged on a carriage (3) made of plastic and guided in the guide rail (4), and that on its edges extending in the displacement direction the carriage (3) has a plurality of slide strips (12, 13, 14) supported in the guide rail (4), which are embodied at one of these edges in the form of resilient bridges (15), which are respectively connected in one-piece with the carriage (3) and are arched toward the outside, wherein a free space (16) is located between each resilient bridge (15) and the adjoining carriage edge, in which a spring (17) is arranged, which charges the resilient bridge (15) in the direction toward the exterior.

5 Claims, 3 Drawing Sheets

5,951,089

SUN VISOR FOR MOTOR VEHICLES

FIELD OF THE INVENTION

The invention relates to a sun visor for motor vehicles, in particular for commercial vehicles, which is mainly intended for placement in the area of the long side of the cab and has a sun visor body, which has two seating brackets, can be pivoted around an approximately horizontal axis and is displaceably conducted via the seating brackets along a guide rail which is parallel with the pivot axis and has a C-shaped profile, open toward the visible side.

BACKGROUND OF THE INVENTION

In connection with a sun visor of the type in accordance with the species, which has been disclosed in German Patent Publication DE 29 25 184 A1, problems in regard to the sliding guide have cropped up in actual use. Because of tolerance fluctuations, as well as heat and cold stresses, it is not possible to easily displace the sun visor body of the known embodiment, while still dependably preventing the sun visor body from being unintentionally displaced along the guide rail.

OBJECT AND SUMMARY OF THE INVENTION

It is therefore the object of the invention to improve the quality of a sun visor of the type mentioned at the outset in such as way, and in particular to see to it, that the sun visor body can be easily displaced along the guide rail in spite of inevitable manufacturing tolerances and temperature stresses, without a displacement on its own being possible.

In accordance with the invention this object is attained in that the ends of the seating brackets facing away from the sun visor body are arranged on a carriage made of plastic and guided in the guide rail, and that on its edges extending in the displacement direction the carriage has a plurality of slide strips supported in the guide rail, which are embodied at one of these edges in the form of resilient bridges, which are respectively connected in one-piece with the carriage and are arched toward the outside, wherein a free space is located between each resilient bridge and the adjoining carriage edge, in which a spring is arranged, which charges the resilient bridge in the direction toward the exterior.

The use of a carriage made of plastic does not entail noticeable costs, in particular since the resilient bridges can be formed thereon in one piece and are made of the same material. The outwardly arched resilient bridges by themselves already represent an important tolerance-compensating improvement in quality, which is further optimized by the spring assigned to each resilient bridge, since a spring made of spring steel or spring wire reacts considerably less intensely to temperature stresses than a resilient bridge made of plastic. The steps in accordance with the invention result in defined frictional conditions and in a dependable compensation of present tolerances.

In a preferred manner, the carriage has two resilient bridges arranged close to its longitudinal ends, which results in an assured, tilt-free displaceability.

The springs acting on the resilient bridges are suitably designed as helical compression springs. Such springs, made of spring wire, can be made available in a cost-effective manner and can also be rapidly and simply installed.

In accordance with a further embodiment of the invention it can be provided that pins for positioning and holding the springs are formed on the back of each bridge, as well as on the edge of each free space facing the bridge.

Finally, it can be provided that the guide rail has locking caps at the ends, which are used as limiting means for the sliding path.

An exemplary embodiment of the invention will be explained in greater detail below by means of the drawings.

DETAILED DESCRIPTION OF THE PREFERRED EMBODIMENT

Figure 1:
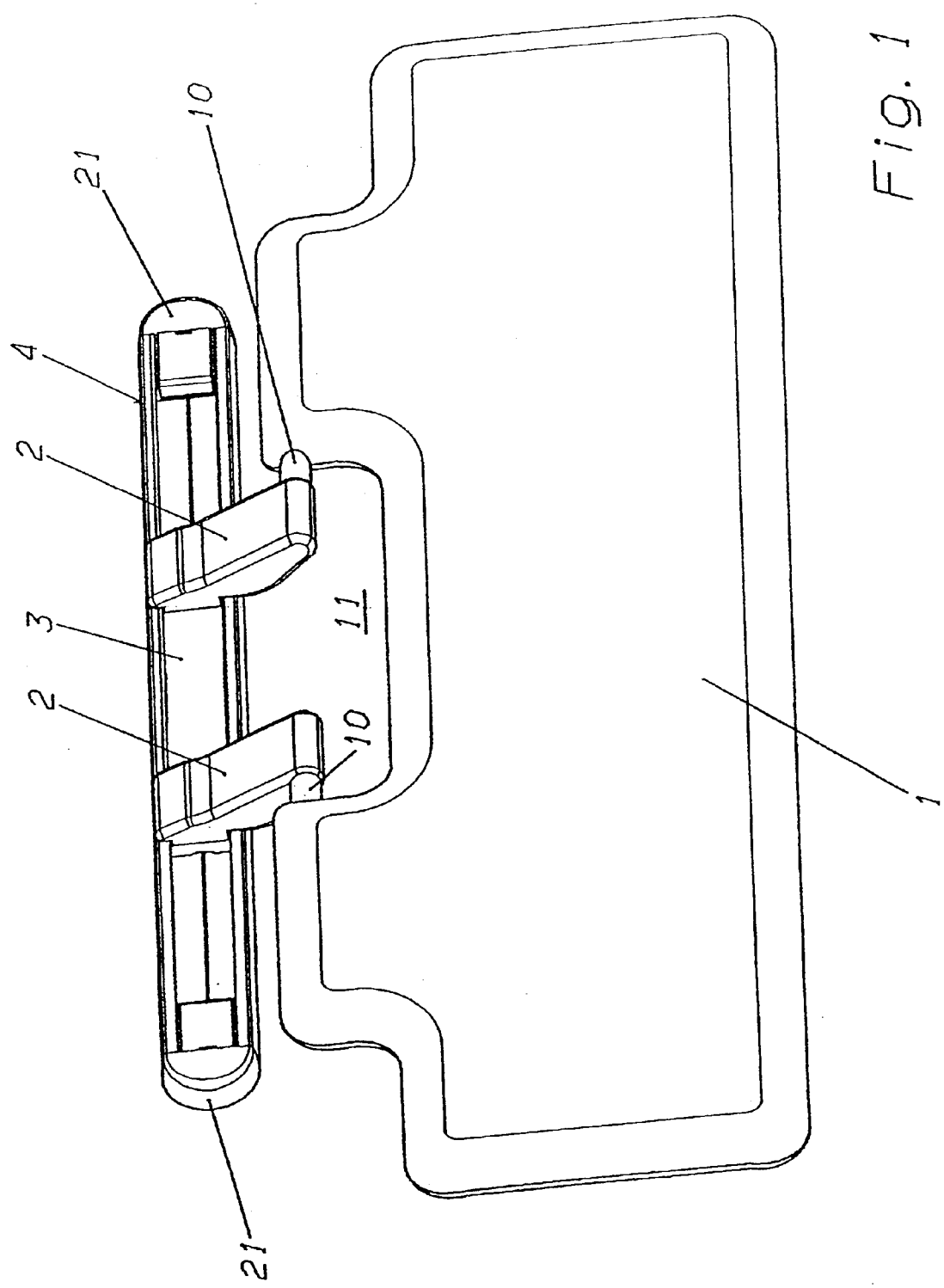
FIG. 1 represents an assembled view of the completed sun visor.

The sun visor in accordance with FIG. 1 comprises a sun visor body 1, two bearing brackets 2, a carriage 3 and a guide rail 4 receiving the carriage 3.

Figure 2:
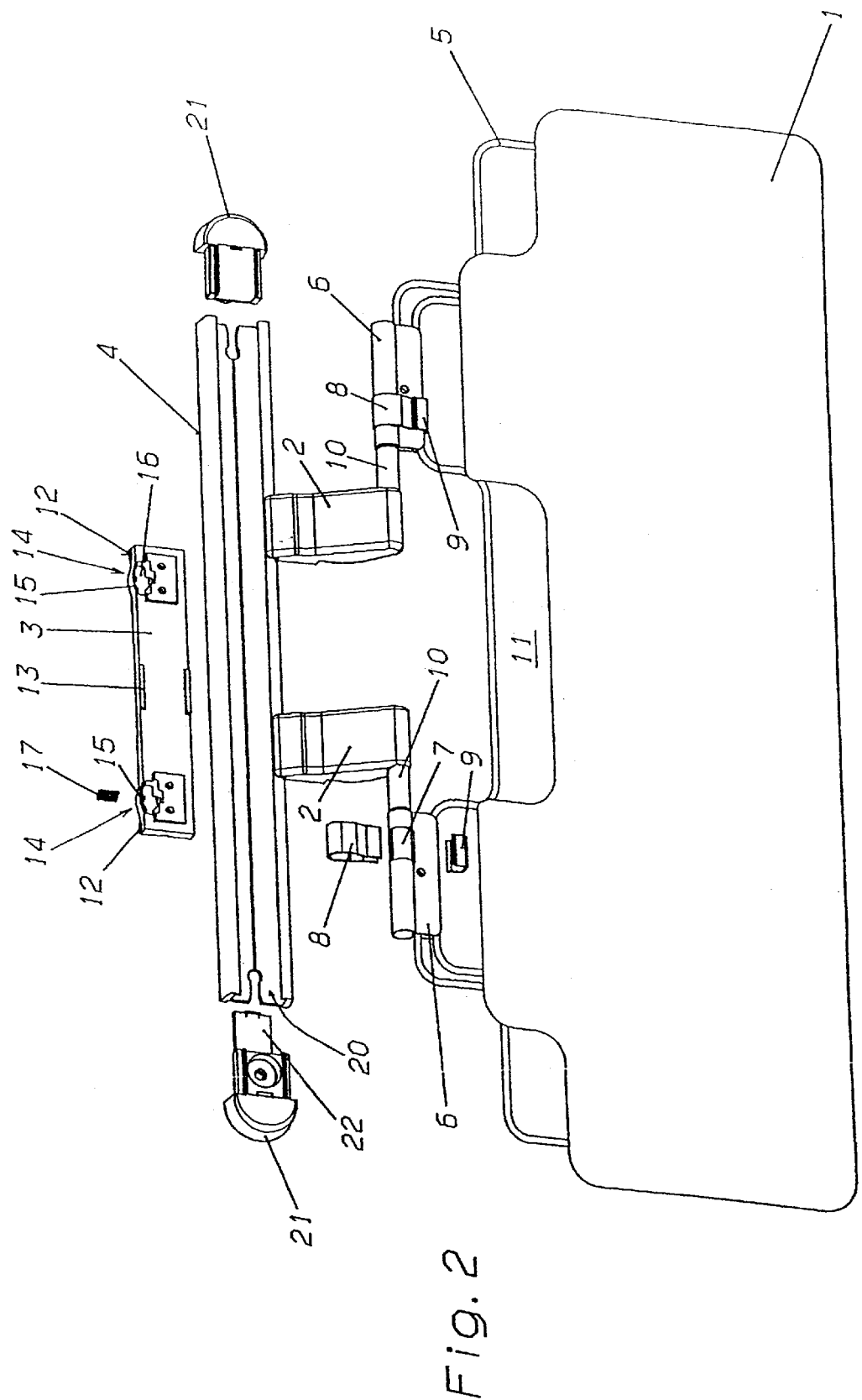
FIG. 2 is an exploded view of the sun visor of FIG. 1.
Figure 3:
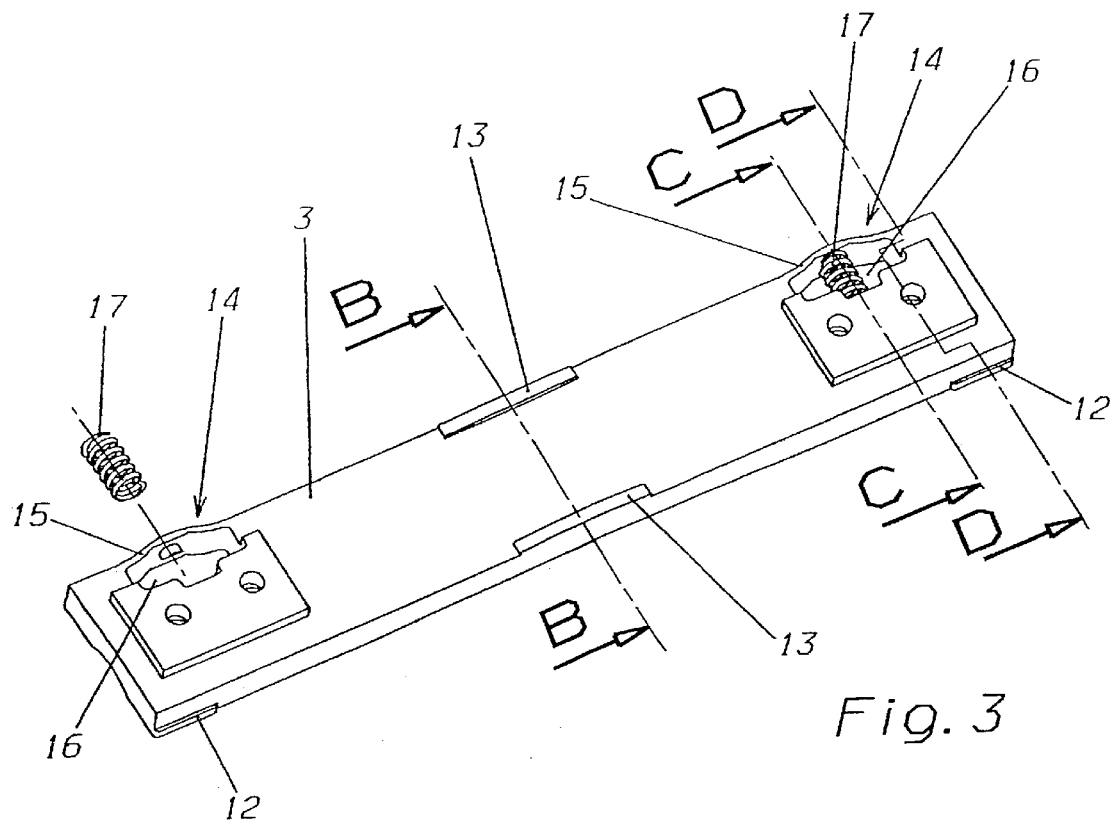
FIG. 3 shows a detail of the sun visor.
Figure 4:
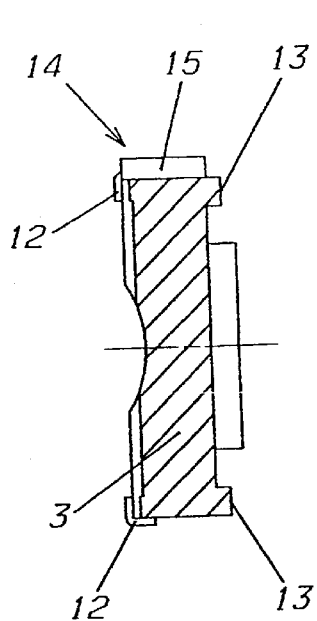
FIG. 4 is a section B—B in FIG. 3.
Figure 5:
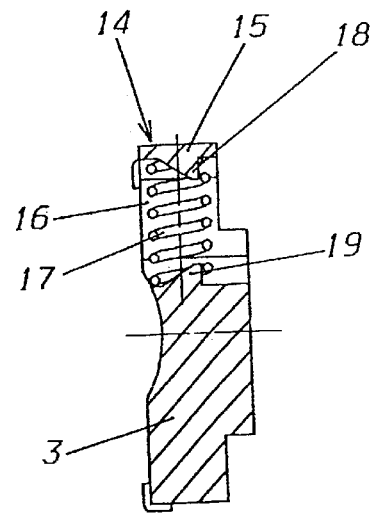
FIG. 5 is a section C—C in FIG. 3.
Figure 6:
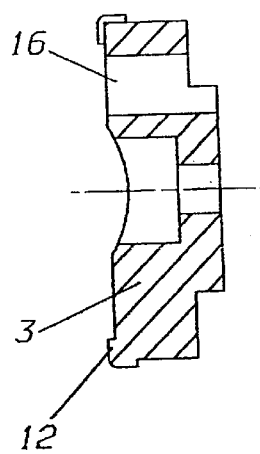
FIG. 6 is a section D—D in FIG. 3.

As can be seen in FIG. 2, the sun visor body 1 has a metal frame 5 made of a bent section of wire. Two retaining bearings 6 with respective window openings 7 are fastened on the metal frame 5. A retaining spring 8 respectively grips around the retaining bearings 6 in a saddle-like manner, and the lower ends of the U-shaped retaining springs 8 are secured by clamps 9 placed thereon.

Shafts 10 arranged on the bearing brackets 2 engage the retaining bearings 6, and the shafts 10 together constitute a horizontally aligned axis of rotation, around which the sun visor body 1 can be pivoted. The bearing brackets 2 are suitably injection-molded plastic bodies with the shaft 10 formed as one piece on them. The bearing openings of the retaining bearings 6 extend from lateral borders of a recess 11 arranged in the area of the longitudinal center of the sun visor body 1, into which areas of the bearing brackets 2 extend.

The end areas of the bearing brackets 2 facing away from the shafts 10 are fastened on the carriage 3 by fastening elements, not represented. The fastening elements can be screws, for example.

The carriage 3 is a plastic injection-molded element of an approximately rectangular shape. On its edges extending in the displacement direction, the carriage 3 has several slide strips 12, 13 and 14, which are supported in the guide rail 4. While the slide strips 12 and 13 are rigidly formed on the carriage 3, the slide strips 14 are embodied as outwardly arched resilient bridges 15. A window-like free space 16 is located between each resilient bridge 15 and the adjoining edge of the carriage 3. The resilient bridges 15 form resilient protrusions. Springs 17 are arranged in the free spaces 16 to support the resilient bridges 15. Preferably the springs 17 are helical compression springs, one end of which is supported at the resilient bridges 15, and the other end at the edges of the carriage 3 adjoining them. Pins 18, 19, which are aligned with each other, are formed for positioning and holding at the back of each resilient bridge 15 as well as on the walls located opposite them. As represented, the pins 18, 19 should be beveled in order to make the assembly easier. The resilient bridges 15 are put under tension in accordance with the desired pushing force.

The carriage 3, finished in this way, then is inserted into the guide opening 20 of the guide rail 4, which is made of a light metal, for example. Thereafter the guide rail 4 is closed by end caps 21 by means of fastening screws, not represented, which can be covered by a formed-on tab 22 of material. Since the carriage 3 is considerably shorter than the guide rail 4, the sun visor body 1 now can be displaced parallel with the guide rail 4, and can of course also be pivoted around the two aligned shafts 10. As tests have shown, the novel sun visor meets the technical demands made by the customers in an optimal manner, and also completely satisfies the esthetic demands of the users.

What is claimed is:

1. A sun visor for motor vehicles, in particular for commercial vehicles, which is mainly intended for placement in the area of a long side of a motor vehicle cab, and having a sun visor body (1), which has two seating brackets (2), can be pivoted around an approximately horizontal pivot axis and is displaceably conducted via the seating brackets (2) along a guide rail (4) which is parallel with the pivot axis and has a C-shaped profile, open toward the visible side, characterized in that the ends of the seating brackets (2) facing away from the sun visor body (1) are arranged on a carriage (3) made of plastic and guided in the guide rail (4), and that on its edges extending in the displacement direction the carriage (3) has a plurality of slide strips (12, 13, 14) supported in the guide rail (4), which are embodied at one of these edges in the 9) form of resilient bridges (15), which are respectively connected in one-piece with the carriage (3) and are arched toward the outside, wherein a free space (16) is located between each resilient bridge (15) and the adjoining carriage edge, in which a spring (17) is arranged, which charges the resilient bridge (15) in the direction toward the exterior.

2. The sun visor in accordance with claim 1, characterized in that the carriage (3) has two resilient bridges (15) arranged near its longitudinal ends.

3. The sun visor in accordance with claim 1, characterized in that the springs (17) charging the resilient bridges (15) are helical compression springs.

4. The sun visor in accordance with claim 1, characterized in that pins (18, 19) for positioning and holding the springs (17) are formed on the back of each bridge (15), as well as on the edge of each free space (16) facing each bridge (15).

5. The sun visor in accordance with at least one of claims 1 to 4, characterized in that the guide rail (4) has locking caps (21) at the ends.

\* \* \* \* \*

UNITED STATES PATENT AND TRADEMARK OFFICE
CERTIFICATE OF CORRECTION

PATENT NO  : 5,951,089
DATED      : September 14, 1999
INVENTOR(S) : Delus et al.

It is certified that error appears in the above-identified patent and that said Letters Patent is hereby corrected as shown below:

In Column 3, Lines 11 and 12, please delete the phrase, "in particular for commercial vehicles, which is mainly intended".

In Column 4, Line 2, please delete "9".

Signed and Sealed this

Twenty-sixth Day of December, 2000

Attest:

Q. TODD DICKINSON

Attesting Officer         Director of Patents and Trademarks